United States Patent [19]
Bertignoll et al.

[11] Patent Number: 5,581,683
[45] Date of Patent: Dec. 3, 1996

[54] LIGHT DIFFUSING APPARATUS WITH U-SHAPED LIGHT GUIDE

[75] Inventors: Friedrich Bertignoll, Ottawa; Paul J. Koens, Ashton, both of Canada

[73] Assignee: Northern Telecom Limited, Montreal, Canada

[21] Appl. No.: 385,844

[22] Filed: Feb. 9, 1995

Related U.S. Application Data

[63] Continuation-in-part of Ser. No. 224,370, Apr. 7, 1994, abandoned.

[51] Int. Cl.$^6$ .......................................... G02B 6/00
[52] U.S. Cl. ........................ 385/146; 362/32; 385/901
[58] Field of Search ............................. 385/31–36, 38, 385/123, 129, 133, 139, 140, 146, 147, 901, 902; 362/32

[56] References Cited

U.S. PATENT DOCUMENTS

| | | | |
|---|---|---|---|
| 4,441,783 | 4/1984 | Houghton et al. | 385/146 |
| 4,824,194 | 4/1989 | Karasawa | 385/146 |
| 4,989,933 | 2/1991 | Duguay et al. | 385/31 |
| 5,001,609 | 3/1991 | Gardner et al. | 362/32 |
| 5,050,946 | 9/1991 | Hathaway et al. | 385/33 |
| 5,059,013 | 10/1991 | Jain | 385/146 X |
| 5,303,322 | 4/1994 | Winston et al. | 385/146 |
| 5,325,271 | 6/1994 | Hutchisson | 362/32 |
| 5,363,458 | 11/1994 | Pan et al. | 385/31 |
| 5,373,571 | 12/1994 | Reid et al. | 385/31 |

*Primary Examiner*—John D. Lee
*Attorney, Agent, or Firm*—R. J. Austin

[57] ABSTRACT

A light diffusing apparatus, which may be used as an elongate visual indicator in telephone sets, video cassette recorders etc, provides very even illumination (i.e., evenly diffused light without any discernible bright spots) when illuminated by spot light from one or two light emitting diodes. The apparatus includes a light guide having a light path of sufficient length to disperse the spot light from the emitting diodes. The dispersed light from the light guide then passes through a light diffuser. The light output end of the light guide and the light input surface of the light diffuser have uniform texture surfaces to further diffuse the dispersed light. The light diffuser may include diffusing particles. Very even illumination without any discernible bright spots is provided.

16 Claims, 3 Drawing Sheets

LIGHT DIFFUSING APPARATUS WITH U-SHAPED LIGHT GUIDE

CROSS REFERENCE

This is a continuation-in-part of U.S. patent application Ser. No. 08/224,370, filed on Apr. 7, 1994 abandoned.

TECHNICAL FIELD

The present invention relates to a light diffusing apparatus and in particular to apparatus for providing substantially evenly diffused light at one end of the apparatus from spot light generated by a light source at the other end of the apparatus.

BACKGROUND ART

Light diffusing apparatus is often used in visual indicators, for example in telephone sets, to indicate that a message has been left by a calling party. Known visual indicators may include an elongate window which transmits the light supplied by a spot source such as a lamp or light emitting diode. However, the window material of these visual indicators does not diffuse the light evenly so as to provide equal brightness throughout the window. This results in a bright spot which appears relative to the position of the lamp in the visual indicator. Other uses of such visual indicators are, for instance, in video cassette recorders and radios.

U.S. Pat. No. 4,989,933 granted to Duguay et al on Feb. 5, 1991 discloses a light guide resonator to produce uniform diffuse light. The light resonator includes reflecting mirrors, a flat and polished transparent slab and a light-diffusing layer which are located at the one end of a light guide. Despite the fact that the light resonator is stated to produce uniform diffuse light by means of light resonation, the resonator is of large and complicated structure and it would be difficult to use effectively on small household items, such as telephones, video cassette recorders, radios, or telephone answering machines.

SUMMARY OF THE INVENTION

The present invention seeks to provide a light guide apparatus of simple structure and which may be relatively small while providing substantially evenly diffused light at one end of the apparatus from spot light generated by a light source at the other end of the apparatus.

According to the most general aspect of the present invention, there is provided apparatus for providing substantially evenly diffused light from spot light generated by a light source. The apparatus comprises: a light guide having first and second end surfaces which are spaced apart from each other at opposite ends; and a light diffuser having opposed elongate light input and output surfaces. The first end surface of the light guide faces the light source to receive the spot light and the second end surface is elongate. The light guide has sufficient length between the first and second end surfaces to disperse the spot light, while the light is transmitted from the first end surface to the second end surface, to provide substantially dispersed light across the entire second end surface. The light input surface of the light diffuser is adjacent to and extending along the second end surface. The second end surface of the light guide and the light input surface of the light diffuser are provided at a light transfer region to transfer the substantially dispersed light from the light guide to the light diffuser. At least one of the surfaces of the light transfer region has a uniform texture to further disperse the dispersed light. The light diffuser is capable of diffusing the dispersed light transferred through the light transfer region substantially evenly across the light output surface of the light diffuser.

The provision of the uniform textured surface in the light transfer region causes a major further dispersion of the light after the light has already been dispersed to a degree within the light guide, this major further dispersion being at a localised position (i.e., at the textured surface) along the light path, so that the total dispersion at this localised position is exceedingly large in comparison to the length of the light guide. Because of the use of the uniform textured surface to achieve this large dispersion of light, the light diffuser itself need have only a short length between its light input and output surfaces to achieve an even distribution of light at the output surface. As a result, the apparatus need only be small for its intended function and may have a sufficiently small size for use, for instance, in bases for telephones, or in other equipment intended for desk or small space usage such as telephone answering machines, or video cassette recorders.

In an example of the apparatus according to the present invention, the light diffuser includes diffusing particles therein. The use of light diffusing particles results in apparatus having similar advantages to those discussed above for the most general aspect of the present invention.

According to another aspect of the present invention, there is provided apparatus for providing substantially evenly diffused light from spot light generated by a light source. The apparatus comprises: a light guide having first and second end surfaces which are spaced apart from each other at opposite ends of the light guide; and a light diffuser having opposed light input and output surfaces. The first end surface of the light guide faces the light source to receive the spot light and the second end surface is elongate. The light guide has sufficient length between the first and second end surfaces to disperse the spot light, while the light is transmitted from the first end surface to the second end surface, to provide substantially dispersed light across the entire second end surface. The light input surface of the light diffuser is adjacent to and extending along the second surface for the light input surface to receive the substantially dispersed light. The light diffuser includes light diffusing particles distributed therein to effect diffusion of the dispersed light substantially evenly across the light output surface.

The distribution of the particles throughout the light diffuser has a paramount effect on light diffusion. This is because the light passes through a wall of upstream and then downstream particles along its travel path so that diffusion increases from particle to particle. It results in large diffusion of light and the apparatus can be effectively used on small household items.

According to yet another aspect of the present invention, there is provided apparatus for providing substantially evenly diffused light from spot light generated by a light source. The apparatus comprises a light guide having first and second end surfaces which are spaced apart from each other at opposite ends of the light guide. The first end surface faces the light source to receive the spot light. The second end surface is elongate. The light guide has an upstream end region extending from the first end surface and a downstream end region extending from the first end region to the second end surface. The first end region is of sufficient length to provide substantially dispersed light. The light guide includes diffusing particles distributed therein at the second end region for diffusing the dispersed light substantially evenly across the second end surface of the light guide.

With the light diffusing particles, the light is effectively diffused along its travel path.

BRIEF DESCRIPTION OF THE DRAWINGS

Embodiments of the present invention will now be described by way of example with reference to the accompanying drawings in which.

BEST MODE OF CARRYING OUT THE INVENTION

Figure 1:
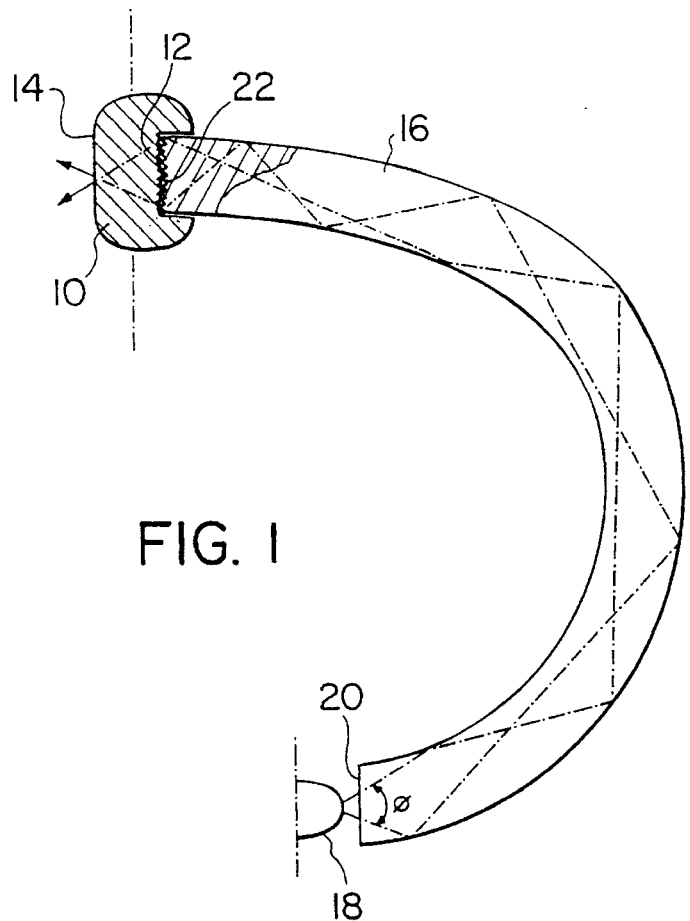
FIG. 1 is a partial sectional view of a light diffusing apparatus according to a first embodiment of the present invention.
Figure 2:
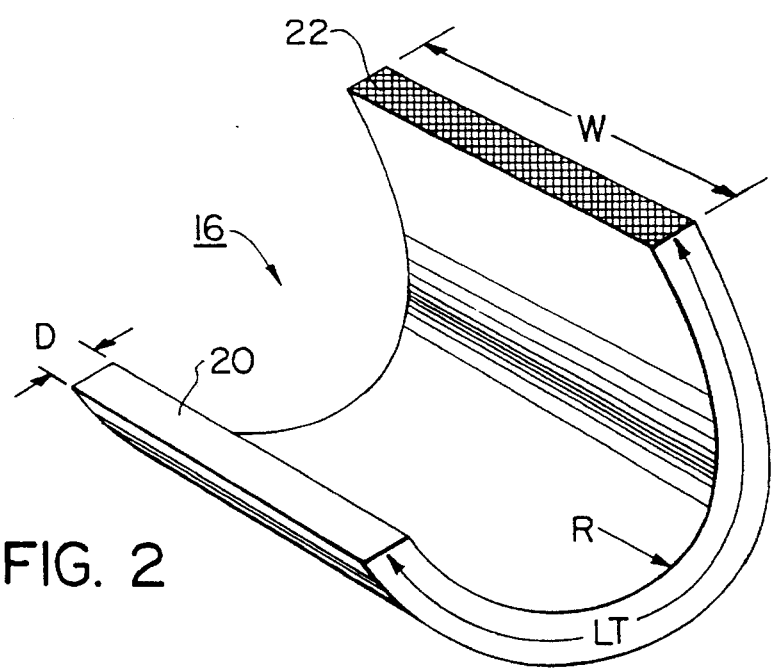
FIG. 2 is an isometric view of a light guide which forms part of diffusing apparatus shown in FIG. 1.
Figure 3:
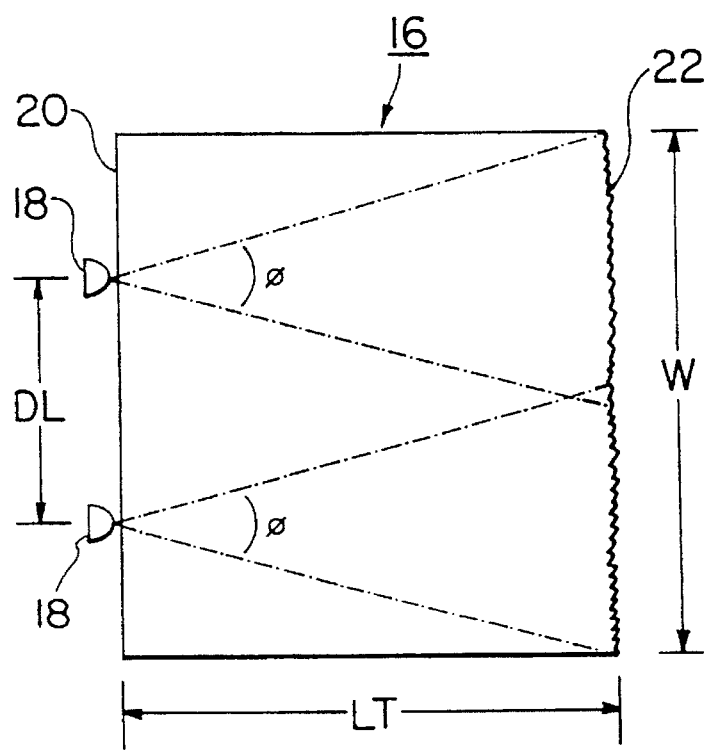
FIG. 3 illustrates the light guide which has been flattened to show the relationship in location of the light guide and light emitting diodes (LEDs) which are shown in FIG. 1.

Referring to FIGS. 1–3, a light diffusing apparatus according to the first embodiment includes a light diffuser 10 having opposed light input and output surfaces 12 and 14 and a U-shaped light guide 16. The light diffuser 10 is made of red optical quality acrylic and the light guide 16 is made of clear optical quality acrylic. The light diffusing apparatus diffuses the light generated by LEDs 18. The light diffuser 10, the light guide 16, and the LEDs 18, are supported by a body of an apparatus (e.g., telephone set, not shown) to which the present invention is applied.

The light guide 16 having a uniform thickness D is substantially rectangular defined by a width W and a total length LT. A side surface of one end region of the light guide opposes a side surface at the other end region caused by virtue of the U-shape as shown by FIGS. 1 and 2. The radius R of the light guide 16 is chosen so that the light does not escape from the light guide 16 while it is transmitted from a light input end 20 to a light output end 22. The light output end 22 has a uniform texture surface and the light input end 20 is flat. The light diffuser 10 forms a cap on the textured light output end 22 and is provided with an elongate light input surface 12 which is coextensive with the light output end 22. The light input surface 12 has also uniform texture. The uniform textures of the light input surface 12 and the light output end 22 are made by an acid etching process in the mould (not shown) used to make the light guide 16 and the light diffuser 10. The characteristics of this uniform textured surface are defined by, for example, 0.0381 mm deep and 27.56 peaks/cm (70 peaks/inch) measured on a Hommel apparatus T1000E-320.

The light emitting surfaces of the LEDs 18 face the light input end 20. The two LEDs 18 are spaced apart by a distance DL. The LEDs 18 are symmetrically located about a center line along the light input end 20 and the light output end 22. The LEDs 18 are surface mount indicator lamps (e.g., red coloured lamps such as Hewlett-Packard HSMH-T400). Each LED 18 emits light radially with 90% of the light generated by each LED 18 concentrated within an angle $\phi$.

The minimum length LT of the light guide 16 is given by:

$$LT=(W-DL)/(2\tan(\phi/2))$$

Examples of measurements are as follows:

D=3.3 mm
W=51.5 mm
LT=50.0 mm
R=13.21 mm $\phi$=29.82°
DL=24.87 mm

Light is radially emitted by the LEDs 18 which are spaced from the light input end 20 of the light guide 16. The radially emitted light enters the light input end 20 and is guided to the light output end 22, by reflecting off the exterior surfaces of the light guide 16. The spot light is dispersed while being transmitted via the light path of the light guide 16. The light path of the U-shaped light guide 16 is sufficiently long to disperse the spot light to provide substantially dispersed light entirely across the light output end 22. It is U-shaped so as to provide a more compact structure for its intended purpose within the base of a telephone set. The light guide 16 could, however, be flat as shown in FIG. 3. The light is first diffused by the uniform texture surface of the light output end 22, when the light radiates therefrom. However, the dispersed light from the light guide 16 still exhibits discernable bright spots from the LEDs 18.

The dispersed light now enters the light diffuser 10. The textured light input surface 12 further diffuses the dispersed light substantially evenly across the light diffuser 10. The diffused light radiating from the light output surface 14 now has substantially equal brightness throughout the light diffuser 10. The light diffusing apparatus exhibits no discernible bright spots, although illuminated by only two light sources (the LEDs 18).

As may be seen from the above measurements, the apparatus of the first embodiment is small and is easily accommodated in a telephone base. Although of small size, the light is evenly diffused at the light output surface 14 of the light diffuser 10. This is because, the light output end 22 of the light guide 16 and the input surface 12 of the light diffuser 10 provide a major further dispersion of light at a localised region (i.e., the light transfer region from the light guide 16 to the light s diffuser 10) after some dispersion has occurred in the light guide. The total dispersion upon the light entering the light diffuser 10 is thus exceedingly large for a short length of light guide. Full diffusion is accomplished with the light diffuser being short in the light travel direction as is clear from FIG. 1.

Figure 4:
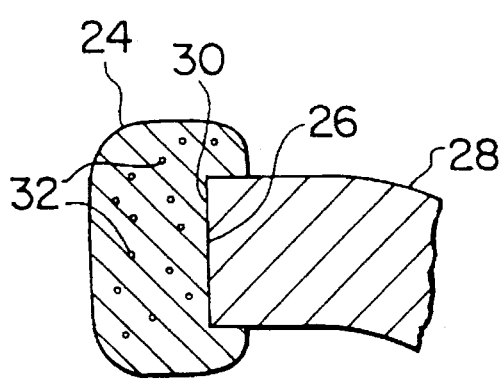
FIG. 4 is a sectional view of a light diffuser and a light guide of an apparatus according to a second embodiment of the present invention.

In the second embodiment shown in FIG. 4, a light diffuser 24 caps the light output end 26 of a light guide 28. The light output end 26 and the light input surface 30 of the light diffuser 24 are flat. The light refractive index of the light diffuser 24 may be different from that of the light guide 28. The light diffuser 24 includes diffusing particles 32 to diffuse the light dispersed by the light guide 28 and provide very even illumination at its output. The diffusing particles 32 are distributed substantially uniformly throughout the light diffuser 24. This adds greatly to the diffusion, because light in passing through the light diffuser 24, passes through a wall of the diffusing particles 32 in which light passes in sequence through upstream and then downstream particles and becomes progressively more diffused upon encountering each diffusing particle.

Figure 5:
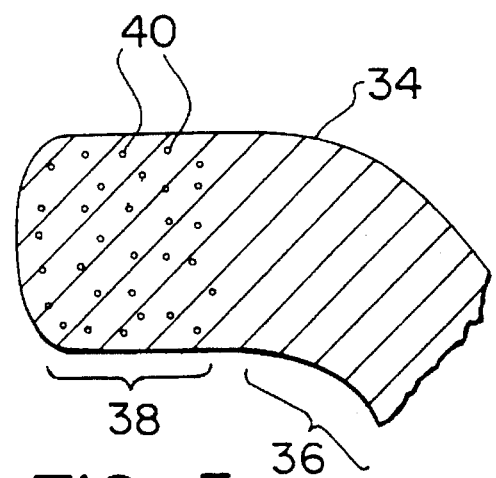
FIG. 5 is a sectional view of part of an apparatus according to a third embodiment of the present invention.

In the third embodiment shown in FIG. 5, a light guide and diffuser 34 of a single transparent plastic element has a light guide region 36 and a light diffuser region 38. The light diffuser region 38 includes diffusing particles 40 substantially evenly distributed throughout this region. The spot light is guided and dispersed by the light guide region 36. The dispersed light is then diffused by the diffusing particles 40 in the manner described for the second embodiment to provide very even illumination.

Figure 6:
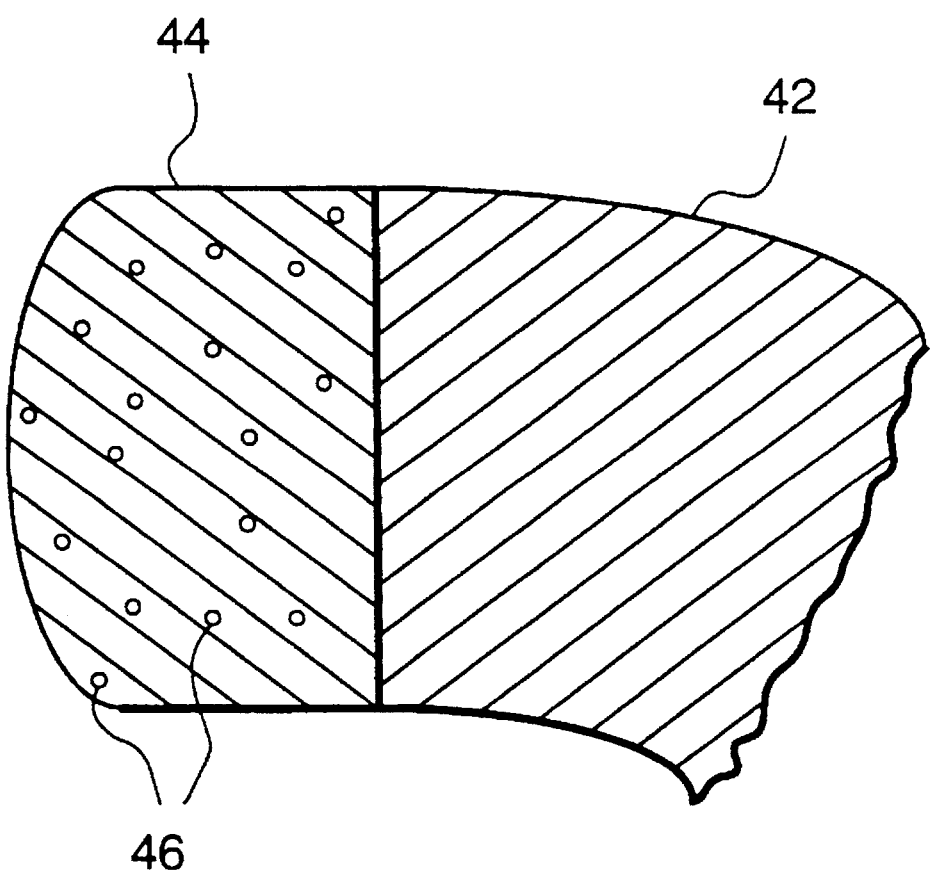
FIG. 6 is a sectional view of part of an apparatus according to a fourth embodiment of the present invention.

In the fourth embodiment in FIG. 6, a light guide 42 of transparent plastic and a separately formed light diffuser 44 of different material are bonded by chemical material. The light diffuser 44 contains diffusing particles 46 substantially evenly distributed throughout as in the second embodiment. The light refractive index of the light diffuser 44 may be different from that of the light guide 42. The dispersed light by the light guide 42 is diffused at the interface area of the guide 42 and the light diffuser 44 and is further diffused by the diffusing particles 46, in the manner explained in the second embodiment, so that very even illumination is provided at the light output side of the light diffuser 44.

The diffusing particles used in the second to fourth embodiments are, for instance, of a plastic material such as sold by ROHM and HAAS under a trade name of "Plexiglas V920". Because this material sufficiently diffuses the dispersed light from the light guide 16, uniform texture of the light input surface of the light guide and the light output end of the light diffuser are unnecessary.

While the LEDs are often red in colour, other colours may be used for light indication. There are variations in the size and shape of the light diffuser and the light guide. The light guide may be sectionally and continuously bent. Also, the number of LEDs used as a light source and the distance DL of the LEDs may vary depending upon the size of the light guide and the light diffuser.

What is claimed is:

1. Apparatus for providing substantially evenly diffused light from light radially emitted by a light source, comprising:
    a substantially U-shaped light guide having first and second end surfaces which are spaced apart from each other at opposite ends of the U-shaped light guide so as to face from the light guide in substantially the same direction, the first end surface facing the light source to receive the radially emitted light with the second end surface being elongate,
    said light guide having sufficient length between the first and second end surfaces to disperse the radially emitted light, while the light is transmitted around the U-shade of the guide from the first end surface to the second end surface, to provide substantially dispersed light across the entire second end surface; and
    a light diffuser having opposed elongate light input and output surfaces, the light input surface being adjacent to and extending along the second end surface, the second end surface of the light guide and the light input surface of the light diffuser provided at a light transfer region to transfer the substantially dispersed light from the light guide to the light diffuser, at least one of the surfaces of the light transfer region having a uniform texture to further disperse the dispersed light, and the light diffuser capable of diffusing the dispersed light transferred through the light transfer region substantially evenly across the light output surface of the light diffuser.

2. Apparatus according to claim 1, wherein the light input surface of the light diffuser has uniform texture to diffuse the substantially dispersed light.

3. Apparatus according to claim 1, wherein the second end surface of the light guide has uniform texture.

4. Apparatus according to claim 1 or 3, wherein the light diffuser includes diffusing particles therein.

5. Apparatus according to claim 4, wherein the light diffusing particles are of plastic material.

6. Apparatus according to claim 1 wherein the light guide is substantially rectangular in cross-section with two major side surfaces and is in U-shape with a major side surface of one end region opposing a major side surface of the other end region of the light guide.

7. Apparatus according to claim 1, wherein the light source comprises two light emitting devices, the distance between which being about a half of the elongate length of the first end surface, the two light emitting devices being centered about the center of the first end surface.

8. Apparatus for providing substantially evenly diffused light from light radially emitted by a light source, comprising:
    a substantially U-shaped light guide having first and second end surfaces which are spaced apart from each other at opposite ends of the U-shaped light guide so as to face from the light guide in substantially the same direction, the first end surface facing the light source to receive the radially emitted light with the second end surface being elongate;
    said light guide having sufficient length between the first and second end surfaces to disperse the radially emitted light, while the light is transmitted around the U-shape of the light guide from the first end surface to the second end surface, to provide substantially dispersed light across the entire second end surface; and
    a light diffuser having opposed light input and output surfaces, the light input surface being adjacent to and extending along the second surface for the light input surface to receive the substantially dispersed light;
    said light diffuser including light diffusing particles distributed therein to effect diffusion of the dispersed light substantially evenly across the light output surface.

9. Apparatus according to claim 8, wherein the diffusing particles are plastic material.

10. Apparatus according to claim 8, wherein the light input surface of the light diffuser is bonded to the second end surface of the light guide.

11. Apparatus according to claim 8, wherein the light source comprises two light emitting devices, the distance between which being about a half of the elongate length of the first end surface, the two light emitting devices being centered about the center of the first end surface.

12. Apparatus for providing substantially evenly diffused light from light radially emitted by a light source, comprising a substantially U-shaped light guide having first and second end surfaces which are spaced apart from each other at opposite ends of the U-shaped light guide, the first end surface facing the light source to receive the radially emitted light with the second end surface being elongate, the light guide having a first end region extending from the first end surface and a second end region extending from the first end region to the second end surface, the first end region being of sufficient length to provide substantially dispersed light, the light guide including diffusing particles distributed therein at the second end region for diffusing the dispersed light substantially evenly across the second end surface of the light guide.

13. Apparatus according to claim 12, wherein the diffusing particles are plastic material.

14. Apparatus according to claim 12, wherein the light source comprises two light emitting devices, the distance between which being about a half of the elongate length of the first end surface, the two light emitting devices being centered about the center of the first end surface.

15. A telephone base housing an apparatus for providing substantially evenly diffused light from spot light generated by a light source, the apparatus comprising:

a substantially U-shaped light guide having first and second end surfaces which are spaced apart from each other at opposite ends of the U-shaped light guide so as to face from the light guide in substantially the same direction, the first end surface facing the light source to receive the emitted light with the second end surface being elongate, said light guide having sufficient length between the first and second end surfaces to disperse the emitted light, while the light is transmitted around the U-shape of the guide from the first end surface to the second end surface, to provide substantially dispersed light across the entire second end surface; and a light diffuser having opposed elongate light input and output surfaces, the light input surface being adjacent to and extending along the second end surface, the second end surface of the light guide and the light input surface of the light diffuser provided at a light transfer region to transfer the substantially dispersed light from the light guide to the light diffuser, at least one of the surfaces of the light transfer region having a uniform texture to further disperse the dispersed light, and the light diffuser capable of diffusing the dispersed light transferred through the light transfer region substantially evenly across the light output surface of the light diffuser.

16. A telephone base according to claim 15 wherein the light guide is substantially rectangular in cross section.

* * * * *